(12) United States Patent
Vassiliou

(10) Patent No.: US 7,640,634 B2
(45) Date of Patent: Jan. 5, 2010

(54) ERGONOMIC FASTENER

(75) Inventor: Eustathios Vassiliou, Newark, DE (US)

(73) Assignee: Termax Corporation, Lake Zurich, IL (US)

( * ) Notice: Subject to any disclaimer, the term of this patent is extended or adjusted under 35 U.S.C. 154(b) by 0 days.

(21) Appl. No.: 11/138,604

(22) Filed: May 26, 2005

(65) Prior Publication Data

US 2005/0217082 A1 Oct. 6, 2005

Related U.S. Application Data

(63) Continuation-in-part of application No. 10/692,828, filed on Oct. 24, 2003, which is a continuation-in-part of application No. 10/164,963, filed on Jun. 7, 2002, now Pat. No. 6,718,599.

(51) Int. Cl.
*F16G 5/00* (2006.01)
*F16G 5/06* (2006.01)

(52) U.S. Cl. ............... 24/294; 24/453; 24/295; 24/293; 411/508; 296/214; 296/1.08

(58) Field of Classification Search ............. 24/289, 24/293–295, 297, 457; 411/508–510, 913; 296/37.7, 37.8, 93.1, 214
See application file for complete search history.

(56) References Cited

U.S. PATENT DOCUMENTS

| | | | | |
|---|---|---|---|---|
| 2,322,656 A | 6/1943 | Murphy | ......................... | 24/73 |
| 2,329,688 A | 9/1943 | Bedford, Jr. | .................. | 189/88 |
| 2,424,757 A | 7/1947 | Klumpp | ........................ | 174/153 |
| 2,542,883 A | 2/1951 | Tinnerman | .................... | 24/259 |
| 2,607,971 A | 8/1952 | Bedford, Jr. | ................... | 24/73 |
| 2,825,948 A | 3/1958 | Parkin | ............................ | 24/73 |
| 3,525,129 A | 8/1970 | Holton | ........................ | 248/188 |
| 3,673,643 A | 7/1972 | Kindell | ........................ | 24/73 B |
| 3,864,789 A | 2/1975 | Leitner | ..................... | 24/73 MF |
| 4,133,246 A | 1/1979 | Small | ............................ | 85/80 |
| 4,245,652 A | 1/1981 | Kelly et al. | ................. | 128/736 |
| 4,431,355 A | 2/1984 | Junemann | ..................... | 411/15 |
| 4,595,325 A | 6/1986 | Moran et al. | ................ | 411/173 |
| 4,609,170 A | 9/1986 | Schnabl | ........................ | 248/71 |
| 4,683,622 A | 8/1987 | Oehlke | ........................ | 24/458 |
| 4,701,984 A | 10/1987 | Wyckoff | ....................... | 24/297 |
| 4,712,341 A | 12/1987 | Harris, Jr. et al. | ............. | 52/208 |
| 4,792,475 A | 12/1988 | Bien | .......................... | 428/137 |
| 4,815,685 A * | 3/1989 | Roberts et al. | ................ | 24/297 |
| 4,981,310 A | 1/1991 | Belisaire | ..................... | 285/162 |

(Continued)

FOREIGN PATENT DOCUMENTS

CA 496700 10/1953

(Continued)

*Primary Examiner*—Robert J Sandy
(74) *Attorney, Agent, or Firm*—Chowdhury & Georgakis, PC

(57) ABSTRACT

Fasteners characterized by structures which are suitable to be engaged reversibly in a slot of a rigid part, such as a metal sheet or the frame of a car for example. The structure provides easy insertion but difficult extraction of the fastener from the slot, without producing squeaking noises during end-use. Easy manufacturing and high dimensional accuracy are also great assets of the fasteners. The invention also pertains to an assembly of said rigid part and the fastener, an assembly connecting parts with the fastener of this invention, as well as vehicles comprising such assemblies.

24 Claims, 2 Drawing Sheets

U.S. PATENT DOCUMENTS

| | | | | |
|---|---|---|---|---|
| 5,092,550 A | 3/1992 | Bettini | | 248/188 |
| 5,095,592 A | 3/1992 | Doerfling | | 24/295 |
| 5,129,768 A | 7/1992 | Hoyle et al. | | 411/182 |
| 5,367,751 A | 11/1994 | DeWitt | | 24/295 |
| 5,373,611 A | 12/1994 | Murata | | 24/297 |
| 5,422,789 A | 6/1995 | Fisher et al. | | 361/719 |
| 5,542,158 A | 8/1996 | Gronau et al. | | 24/295 |
| 5,795,118 A | 8/1998 | Osada et al. | | 411/171 |
| 5,887,319 A | 3/1999 | Smith | | 24/293 |
| 5,919,019 A | 7/1999 | Fisher | | 411/182 |
| 5,987,714 A | 11/1999 | Smith | | 24/295 |
| 5,992,914 A | 11/1999 | Gotoh et al. | | 296/39.1 |
| 6,074,150 A | 6/2000 | Shinozaki et al. | | 411/508 |
| 6,101,686 A | 8/2000 | Velthoven et al. | | 24/295 |
| 6,141,837 A | 11/2000 | Wisniewski | | 24/295 |
| 6,203,240 B1 | 3/2001 | Hironaka et al. | | 403/397 |
| 6,279,207 B1 | 8/2001 | Vassiliou | | 24/293 |
| 6,353,981 B1 | 3/2002 | Smith | | 24/295 |
| 6,381,811 B2 | 5/2002 | Smith et al. | | 24/289 |
| 6,527,471 B2 | 3/2003 | Smith et al. | | 24/293 |
| 6,648,542 B2 | 11/2003 | Smith et al. | | 24/293 |
| 6,691,380 B2 | 2/2004 | Vassiliou | | 24/295 |
| 6,718,599 B2 | 4/2004 | Dickinson et al. | | 24/295 |
| 6,745,440 B2 | 6/2004 | Vassiliou | | 24/295 |
| 6,846,125 B2 | 1/2005 | Smith et al. | | 24/293 |
| 6,857,168 B2 * | 2/2005 | Lubera et al. | | 24/293 |
| 6,868,588 B2 | 3/2005 | Dickinson et al. | | 24/295 |
| 7,168,138 B2 * | 1/2007 | Lubera et al. | | 24/295 |
| 7,213,304 B2 * | 5/2007 | Lubera et al. | | 24/295 |
| 7,318,256 B2 * | 1/2008 | Lubera et al. | | 24/295 |
| 7,320,157 B2 * | 1/2008 | Lubera et al. | | 24/295 |

FOREIGN PATENT DOCUMENTS

DE            2255094 A     5/1973

* cited by examiner

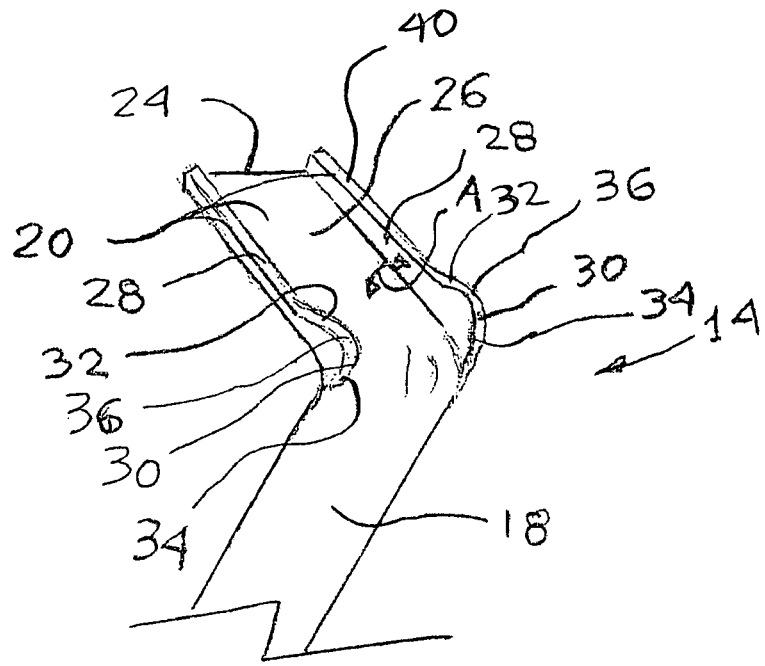
FIG. 4
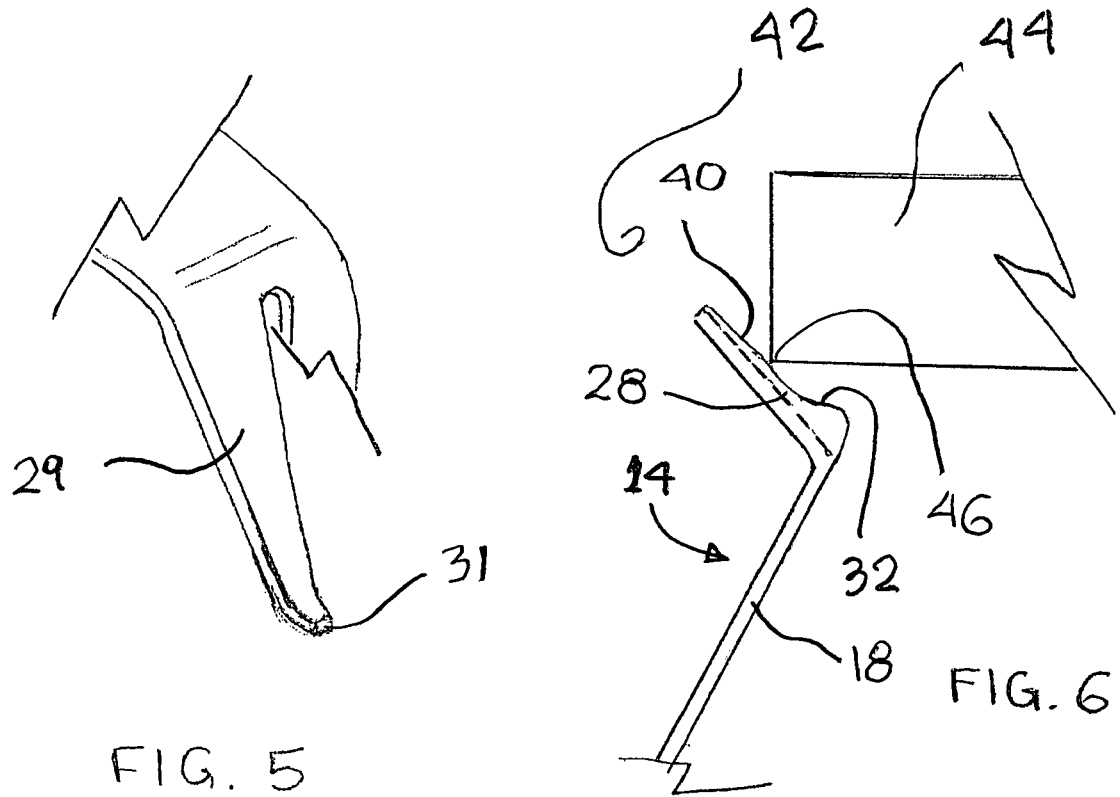
FIG. 5
FIG. 6

ERGONOMIC FASTENER

RELATED APPLICATIONS

This application is a continuation in part of non-provisional application Ser. No. 10/692, 828, filed on Oct. 24, 2003, which is a continuation in part of non-provisional application Ser. No. 10/164,963, filed Jun. 7, 2002, now U.S. Pat. No. 6,718,599, U.S. Pat. No. 6,868,588, and Divisional application Ser. No. 10/704,094, filed Nov. 7, 2003, all of which are based on priority of provisional patent applications 60/301,364, filed Jun. 25, 2001, 60/327,814, filed Oct. 9, 2001, and 60/353,515, filed Feb. 1, 2002. All of the above are incorporated herein by reference in their entirety.

FIELD OF THE INVENTION

This invention relates to fasteners characterized by structures which are suitable to be engaged reversibly in a slot of a rigid part, such as a metal sheet or the frame of a car for example. The structure is critical in a manner to provide easy insertion but difficult extraction of the fastener from the slot, without producing squeaking noises during end-use. The invention also pertains to an assembly of said rigid part and the fastener, an assembly connecting parts with the fastener of this invention, as well as vehicles comprising such assemblies.

BACKGROUND OF THE INVENTION

A number of fasteners have been used in the past for securing one object on another object, as for example, securing an article such as for example a plastic sheet on a metal or other rigid plastic sheet. However, the fasteners of the type, which are improved by the advances of the present invention, and being used presently, have a rather low ratio of insertion force to removal force. In other words, they require considerable force to be inserted into a slot in order to provide adequate removal resistance in order to be removed from the slot. This is ergonomically inferior performance, and the operators may suffer miscellaneous ailments, while productivity is also considerably undermined. In other cases, disadvantages, such as unacceptable squeaking noises during their use in vehicles for example, make such fasteners undesirable and inferior.

Examples of conventional fasteners are disclosed in U.S. Pat. No. 5,987,714 (Smith); U.S. Pat. No. 5,887,319 (Smith); U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi); U.S. Pat. No. 5,095,592 (Doerfling); U.S. Pat. No. 4,792,475 (Bien); U.S. Pat. No. 4,683,622 (Ohelke); U.S. Pat. No. 4,609,170 (Schnabl); U.S. Pat. No. 4,245,652 (Kelly et al.); U.S. Pat. No. 3,864,789 (Leitner); U.S. Pat. No. 3,673,643 (Kindell); U.S. Pat. No. 3,525,129 (Holton); U.S. Pat. No. 2,825,948 (Parkin); U.S. Pat. No. 2,607,971 (Bedford, Jr.); U.S. Pat. No. 2,542,883 (Tinnerman); U.S. Pat. No. 2,329,688 (Bedford, Jr.); U.S. Pat. No. 2,322,656 (Murphy), among others.

U.S. Pat. No. 5,919,019 (Fisher) provides fasteners which can only be permanently installed into a slot; they can only be inserted but not extracted without damage to parts of the fastener. The major engagement is performed by spring strips, while frictional portions of the fastener pass through the slot with at most slight compression, and immediately after the insertion of the fastener they are located in slightly spaced or barely contacting relation with the edges of the slot. They are only activated for engagement after the insertion of a bolt into a hole at the base plate. Thus, the profound effect of the increased removal to insertion ratio (explained in detail hereinbelow) is not recognized, mentioned, or implied. Thus, the intentionally provided distance of the frictional portions away from the edges of the slot by Fisher, during insertion and before use of the bolt, teaches actually away from the instant invention, which recognizes and takes full advantage of the increased removal to insertion ratio by an engagement region having a hindrance portion. According to one embodiment if the engagement surfaces of the instant invention were located in slightly spaced or barely contacting relation with the edges of the slot, no engagement at all would take place upon insertion of the fastener of this invention into the slot.

U.S. Pat. No. 6,141,837 (Wisniewski) describes a spring fastener comprising bulbous and outwardly projecting portions, which assist in preventing withdrawal of the clip and associated molding from an aperture of a vehicle frame. However, "bulbous projections" are necessarily voluminous, take most of the space in the inwardly directed section which acts as an engagement region, and unless they are manufactured within tight tolerances with regard to the thickness of the frame, the "base plates" do not sit on the frame (see also the Figures), rendering the structure unstable.

U.S. Pat. No. 6,203,240 B1 (Hironaka et al.), U.S. Pat. No. 5,129,768 (Hoyle et al.), U.S. Pat. No. 5,092,550 (Bettini), U.S. Pat. No. 4,981,310 (Belissaire), U.S. Pat. No. 4,712,341 (Harris, Jr. et al.), U.S. Pat. No. 4,595,325 (Moran et al.), U.S. Pat. No. 4,431,355 (Junemann), U.S. Pat. No. 4,133,246 (Small), and U.S. Pat. No. 2,424,757 (F. Klump, Jr.) are directed to plastic or metal fasteners which are designed to be just inserted into the slot of a panel, but not extracted without damage to the fastener (if such extraction would be attempted from the front side; the side from which the fastener is inserted into the panel, since the back part of the panel is not reachable in the cases, wherein such types of fasteners are used).

U.S. Pat. No. 6,691,380 (Vassiliou) and U.S. Pat. No. 6,745,440 (Vassiliou) disclose fasteners having bent teeth which, however, either produce squeaking noises if they are extending very little, or they prevent extraction of the fastener from a slot without distraction of the fastener, if the teeth extend too much.

In contrast, this invention is characterized by critical configurations providing superior fasteners lacking the above undesirable properties.

SUMMARY OF THE INVENTION

As aforementioned, this invention relates to fasteners characterized by structures which are suitable to be engaged reversibly in a slot of a rigid part, such as a metal sheet or the frame of a car for example. The structure is critical in a manner to provide easy insertion but difficult extraction of the fastener from the slot, without producing squeaking noises during end-use. The invention also pertains to an assembly of said rigid part and the fastener, an assembly connecting parts with the fastener of this invention, as well as vehicles comprising such assemblies.

More particularly, the invention pertains a fastener comprising a main body and a wing, the wing comprising an outwardly directed section springingly connected to the main body at a first bend and an inwardly directed section connected to the outwardly directed section at a second bend opposite the first bend, the inwardly directed section having a free end, a base segment, and a twisted segment, the twisted segment having a front edge and a back edge, the front edge having a low site in the vicinity of the second bend, and a high site, the back edge being curved from the high site toward the base segment of the inwardly directed section, and wherein the inwardly directed section has an optional bent section in the vicinity of the free end.

It is preferable that the twisted segment of the fastener has a twist angle with respect to the base segment of the inwardly directed section in the range of substantially 5 to 175 degrees, more preferably in the range of substantially 75 to 105 degrees, and even more preferably of substantially 90 degrees.

It is also preferable that at least a portion of the front edge in the vicinity of the low site of the twisted segment is substantially on the same plane as the outwardly section, and/or that the back edge has a curvature of a gradually decreasing slope.

The Main body may have the form of a U-shaped structure, preferably comprising at least one barb, and even more preferably the at least one barb is bent inwardly in the vicinity of its front end.

Further, it is preferable that the at least one barb is cut from a respective side of the U-shaped structure, is flexible, and as aforementioned is bent in the vicinity of its front end as described for example in U.S. Pat. Nos. 6,279,207, and 6,691, 380, which are incorporated herein by reference.

The at lest one barb may have variable width along its length, or it may have substantially the same width along its length.

The fastener of the instant invention may further comprise a molded elastic body under the top portion of said fastener. Such arrangements are disclosed in U.S. Pat. No. 6,353,981 and which is incorporated herein by reference.

The fastener of the instant invention may further comprise:
an elastic body comprised of at least a gasket, the gasket extending away from the closed cavity in the vicinity of the top portion of the fastener and enclosing at least partially the cavity; and
a casing surrounding at least partially the spring fastener under the top portion, except at least the engagement section of each engagement spring, the casing also at least partially surrounding the cavity and such portion of the elastic body which at least partially encloses the cavity;
wherein the casing has lower ultimate elongation, higher Shore hardness, and higher shear strength than the elastic body.

Such arrangements are disclosed in U.S. Pat. No. 6,381, 811 B2, which is incorporated herein by reference.

According to the present invention, any embodiments of fasteners described above and their equivalents may be used in any assembly in which a part and another part are connected with the fastener, as well as in any vehicle comprising such an assembly or such a fastener or its equivalents.

DESCRIPTION OF THE DRAWING

The reader's understanding of practical implementation of preferred embodiments of the invention will be enhanced by reference to the following detailed description taken in conjunction with perusal of the drawing figures, wherein:

FIG. 4 illustrates a fragmental perspective view of the wing of FIG. 2.

FIG. 5 illustrates a fragmental perspective view of a barb which is bent inwardly in the vicinity of the front end.

FIG. 6 illustrates the fragmental side view of the wing of FIG. 2, wherein the corner of a slot resides on the sliding edge of the wing.

DETAILED DESCRIPTION OF THE INVENTION

Figure 1:
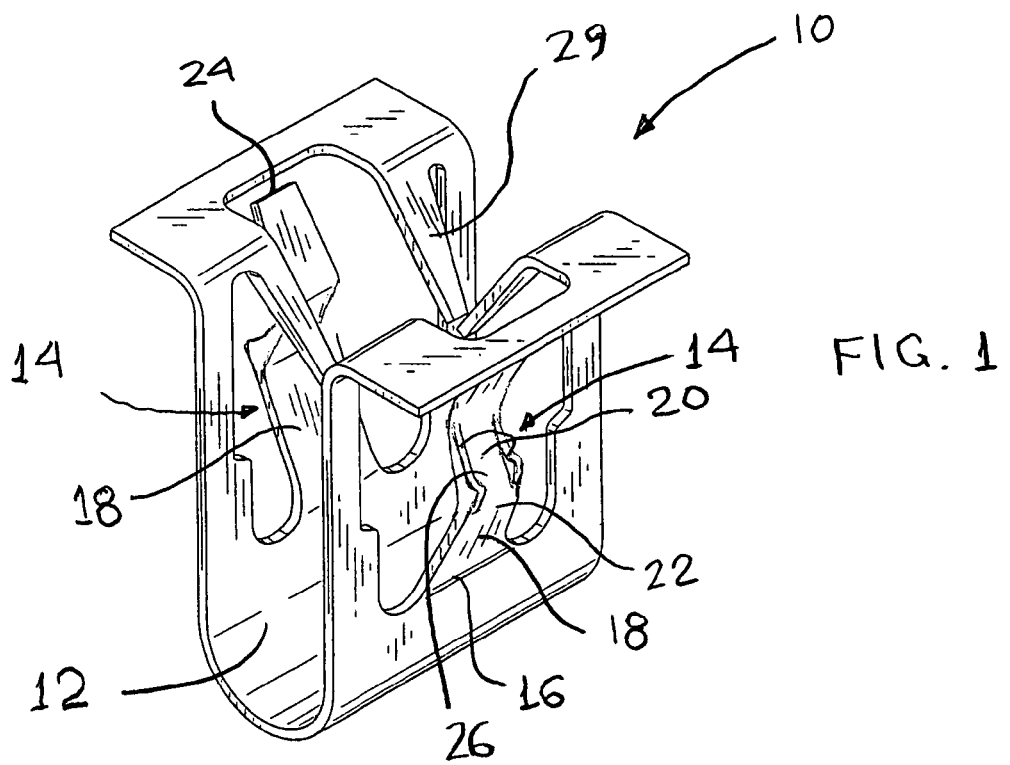
FIG. 1 illustrates a perspective view of a fastener according to a preferred embodiment of the present invention, comprising twisted segments on the inwardly directed sections of wings.
Figure 2:
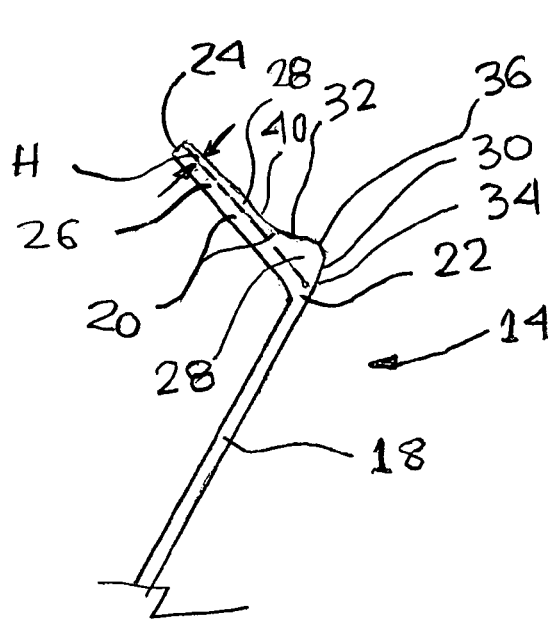
FIG. 2 illustrates a fragmental side view of a wing comprising a twisted segment on the inwardly directed section, which section has a free end.
Figure 3:
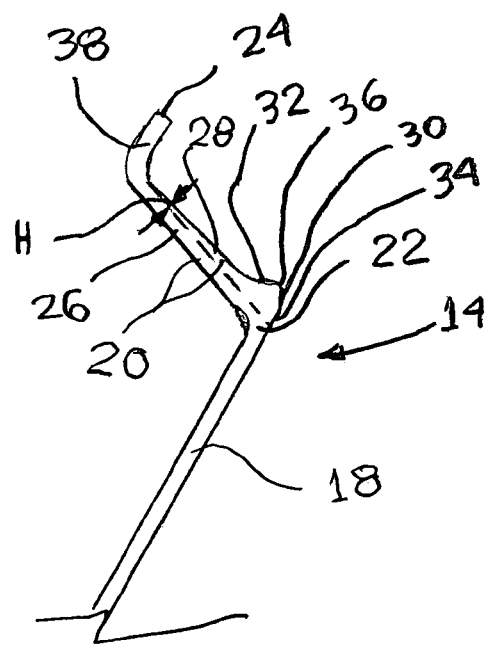
FIG. 3 illustrates the fragmental side view of the wing of FIG. 2, wherein the inwardly directed section has a bent section in the vicinity of the free end.

As aforementioned, this invention relates to fasteners characterized by structures which are suitable to be engaged reversibly in a slot of rigid part, such as a metal sheet or the frame of a car for example. The structure provides easy insertion but difficult extraction of the fastener from the slot, without producing squeaking noises during end-use. The invention also pertains to an assembly of said rigid part and the fastener, an assembly connecting parts with the fastener of this invention, as well as vehicles comprising such assemblies.

Referring now to FIGS. 1-4, there is depicted an example of a fastener 10 according to the present invention, wherein (FIG. 1) the fastener has a U-shaped structure.

The fastener 10 comprises a main body 12 and a wing 14 connected to the main body 12 at a first bend 16. The wing 14 comprises an outwardly directed section 18 springingly connected to the main body 12 at the first bend 16.

The wing 14 further comprises an inwardly directed section 20 connected to the outwardly directed section 18 at a second bend 22 opposite the first bend 16.

The inwardly directed section 20 has a free end 24, a base segment 26, and a twisted segment 28. The twisted segment 28 has a front edge 30, a back edge 32, and a sliding edge 40, which includes the back edge 32. The front edge 30 has a low site 34 in the vicinity of the second bend 22, and a high site 36.

The back edge 32 is curved from the high site 36 toward the base segment 26 of the inwardly directed section 20. The inwardly directed section 20 may have a bent section in the vicinity of the free end 24.

It is highly preferable that the back edge 32 has a curvature of a gradually decreasing slope. It is also preferable that at least a portion of the front edge 30 in the vicinity of the low site 34 of the twisted segment 28 is substantially on the same plane as the outwardly section 18.

It is preferable that the twisted segment 28 of the fastener 10 has a twist angle A with respect to the base segment 26 of the inwardly directed section 20 in the range of substantially 5 to 175 degrees, more preferably in the range of substantially 75 to 105 degrees, and even more preferably of substantially 90 degrees.

The height H of the twisted segment 28 in the vicinity of the free end 24 may be substantially zero or it may be increased, preferably gradually.

The fastener 10 may comprise at least one barb 29 (FIG. 1), which is preferably bent at its front end 31 (FIG. 5).

In operation, the fastener 10 as exemplified in FIG. 1 is inserted into a slot 42 of a rigid part 44 (FIG. 6). The outwardly directed section 18, which is springingly connected to the main body 12 of the fastener 10, retracts and allows the fastener 10 to pass through the slot 42 in a manner that the corner 46 of the rigid part 44 finally is forced to reside on the sliding edge 40 of the twisted segment 28.

If and when the rigid part 44 is forced, being a portion of the frame of a vehicle for example, the corner 46 of the rigid part slides on the siding edge 40 smoothly. Even if it reaches the back edge 32 finds great resistance to overcome it, and at the same time it continues the smooth sliding, due to the gradual curvature of the back edge 32, and thus it does not produce any grinding or squeaking noises. This is a great advantage, especially because in addition to the above advantages, the manufacturability and dimensional accuracy are excellent since they involve the steps of just cutting and bending.

According to the present invention, any embodiments of fasteners described above and their equivalents may be used in any assembly in which a part and another part are connected with the fastener, as well as in any vehicle comprising such an assembly or such a fastener or its equivalents.

It should also be understood that the miscellaneous embodiments and features of the instant invention may be used in any combination or by themselves in other articles or devices, where they may be needed.

Examples of embodiments demonstrating the operation of the instant invention, have been given for illustration purposes only, and should not be construed as restricting the scope or limits of this invention in any way.

What is claimed is:

1. A fastener comprising a main body and a wing, the wing comprising an outwardly directed section springingly connected to the main body at a first bend and an inwardly directed section connected to the outwardly directed section at a second bend opposite the first bend, the inwardly directed section having a free end, a base segment, and at least one twisted segment extending from the base segment and being provided with only one projection, the at least one twisted segment having a front edge and a back edge forming the one projection, the front edge having a low site in the vicinity of the second bend, and a high site, the back edge being curved from the high site toward the base segment of the inwardly directed section.

2. A fastener as defined in claim 1, wherein the twisted segment has a twist angle with respect to the base segment of the inwardly directed section in the range of substantially 5 to 175 degrees.

3. A fastener as defined in claim 2, wherein the twisted segment has a twist angle with respect to the base segment of the inwardly directed section in the range of substantially 75 to 105 degrees.

4. A fastener as defined in claim 3, wherein the twisted segment has a twist angle with respect to the base segment of the inwardly directed section substantially 90 degrees.

5. A fastener as defined in claim 1, wherein at least a portion of the front edge in the vicinity of the low site of the twisted segment is substantially on a same plane as the outwardly section.

6. A fastener as defined in claim 5, wherein the back edge has a curvature of a gradually decreasing slope.

7. A fastener as defined in claim 1, wherein the back edge has a curvature of a gradually decreasing slope.

8. A fastener as defined in claim 1, wherein the main body has the form of a U-shaped structure.

9. A fastener as defined in claim 8, wherein the main body further comprises at least one barb.

10. A fastener as defined in claim 8, further comprising at least one barb having a front end, the at least one barb being bent inwardly in the vicinity of said front end.

11. A fastener as defined in claim 1, wherein the front edge has a slope different from the back edge.

12. A vehicle comprising parts connected with a fastener, the fastener comprising a main body and a wing, the wing comprising an outwardly directed section springingly connected to the main body at a first bend and an inwardly directed section connected to the outwardly directed section at a second bend opposite the first bend, the inwardly directed section having a free end, a base segment, and at least one twisted segment extending from the base segment and being provided with only one projection, the at least one twisted segment having a front edge and a back edge forming the one projection, the front edge having a low site in the vicinity of the second bend, and a high site, the back edge being curved from the high site toward the base segment of the inwardly directed section.

13. A vehicle as defined in claim 12, wherein the twisted segment has a twist angle with respect to the base segment of the inwardly directed section in the range of substantially 5 to 175 degrees.

14. A vehicle as defined in claim 13, wherein the twisted segment has a twist angle with respect to the base segment of the inwardly directed section in the range of substantially 75 to 105 degrees.

15. A vehicle as defined in claim 14, wherein the twisted segment has a twist angle with respect to the base segment of the inwardly directed section substantially 90 degrees.

16. A vehicle as defined in claim 12, wherein at least a portion of the front edge in the vicinity of the low site of the twisted segment is substantially on a same plane as the outwardly section.

17. A vehicle as defined in claim 16, wherein the back edge has a curvature of a gradually decreasing slope.

18. A vehicle as defined in claim 12, wherein the back edge has a curvature of a gradually decreasing slope.

19. A vehicle as defined in claim 12, wherein the main body has the form of a U-shaped structure.

20. A vehicle as defined in claim 19, wherein the main body further comprises at least one barb.

21. A vehicle as defined in claim 19, further comprising at least one barb having a front end, the at least one barb being bent inwardly in the vicinity of the front end.

22. A vehicle as defined in claim 12, wherein the front edge has a slope different from the back edge.

23. A fastener comprising
a main body;
a wing, the wing comprising an outwardly directed section springingly connected to the main body at a first bend and an inwardly directed section connected to the outwardly directed section at a second bend opposite the first bend,
the inwardly directed section having a free end, a base segment, and at least one twisted segment extending from the base segment and being provided with only one projection, each at least one twisted segment having a front edge and a back edge forming the one projection, the front edge having a low site in the vicinity of the second bend, and a high site, the back edge having a constant curvature near the high site toward the base segment of the inwardly directed section.

24. A fastener as defined in claim 23, wherein at least a portion of the front edge in the vicinity of the low site of the at least one twisted segment is on a same plane as the outwardly section.

\* \* \* \* \*